Aug. 21, 1956  N. F. ANDREWS  2,759,317
WAGON ELEVATOR ADJUSTING MEANS FOR HARVESTERS
Filed Dec. 3, 1953  2 Sheets-Sheet 1

INVENTOR.
N. F. ANDREWS
ATTORNEYS

INVENTOR.
N. F. ANDREWS

ATTORNEYS ic Office 2,759,317
Patented Aug. 21, 1956

2,759,317

WAGON ELEVATOR ADJUSTING MEANS FOR HARVESTERS

Norman F. Andrews, Ankeny, Iowa, assignor to Deere Manufacturing Co., Dubuque, Iowa, a corporation of Iowa Application December 3, 1953, Serial No. 395,919

12 Claims. (Cl. 56—15)

The present invention relates generally to an agricultural machine of the harvester class and more particularly to elevator adjusting means therefor.

In many instances in the past, the entire harvester, including the elevator, has been so constructed that when mounted it acts as a single rigid unit. The general method of raising the front or gathering end of the harvester so as to avoid obstructions in the line of travel was to rock the entire picker about a transverse axis located rearwardly of the gathering unit. Being a rigid unit this caused a responsive drop of the portion to the rear of the axis, culminating in its maximum downward movement at the discharge end of the elevator. Difficulty occurred when the clearance between the elevator and the top edge of the trailer or wagon collecting the corn was not sufficient to prevent the elevator from colliding with the trailer when the gathering unit was raised. Therefore, a greater clearance than was otherwise necessary and practical was required to avoid this collision.

Therefore, it is the main object of this invention to provide a new and improved method for moving the discharge portion of the wagon elevator forwardly and away from the wagon or trailer when the gathering unit is raised.

Up to this time it has been the general practice in the art to use guy wires or linkages generally in tension to support the elevator and also for adjusting the position of the elevator. Often these connections are numerous and are in such a location as to be difficult to reach and adjust, besides interfering with the operator's comfort. It is therefore, also an object of this invention to provide a simple column, fulcrumed to the frame for fore-and-aft swinging, to support the elevator, and it is further the purpose of the invention to utilize the elevator itself as connecting and force transmitting means between the upper end of the column and the adjusting means for moving and holding the column in the desired position.

Other objects will become readily apparent to those skilled in the art after a consideration of the following description in reference to the accompanying drawings.

Figure 1:
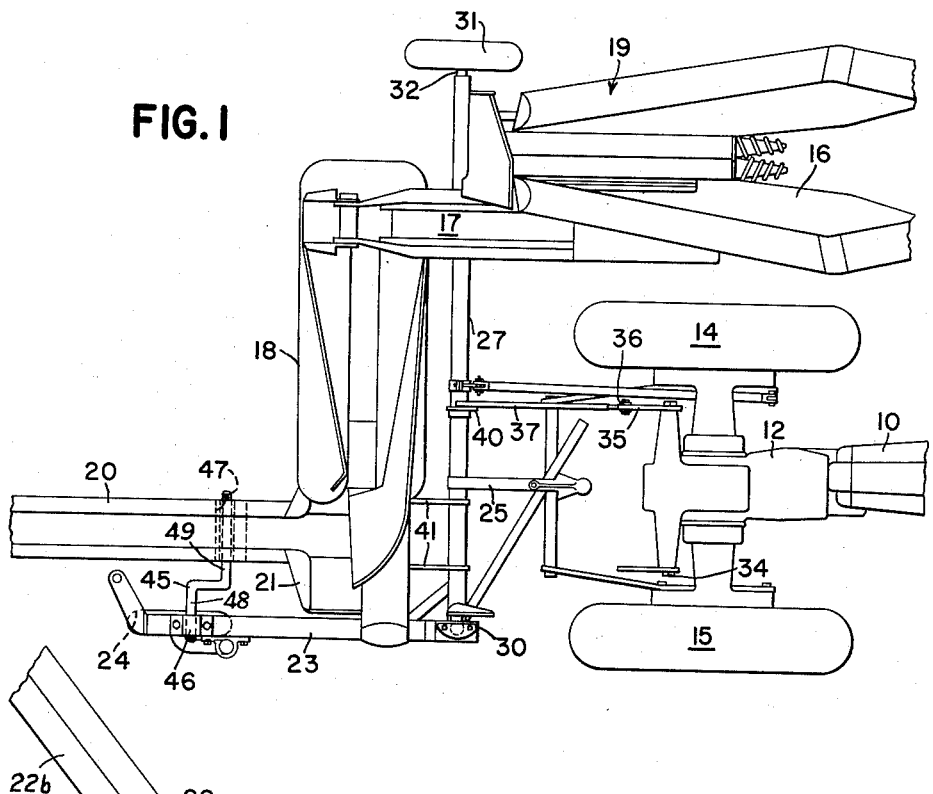
Fig. 1 is a plan view of portions of the tractor and harvester embodying one form of the invention. For clarity many of the essential features of the harvester such as the power transmitting system have been omitted since they are not essential to an understanding of the invention.

Referring now to the drawings, numeral 10 refers to a tractor of a conventional type comprising a frame 11 supporting a longitudinally extending tractor body 12 and in turn supported by the rear axle 13, two rear wheels 14, 15, and front wheels not shown.

Extending to the rear and to the side of the tractor 10 is a harvesting unit 19 comprising, at the side of the tractor, a crop gathering and snapping unit 16 having rigidly fixed at its rear section a crop-receiving portion including a husker feeding elevator 17 and a husking unit 18 disposed transversely and to the rear of the tractor. A wagon elevator assembly 20 comprising a hopper 21 and an elevator unit 22 that has a lower intake end 22a and that extends upwardly and rearwardly to a discharge end 22b.

Main supporting means for the corn harvester is a rigid fore-and-aft extending frame 23, supported at its rear by a caster wheel 24 and at its front by the tractor drawbar 25 so as to permit vertical swinging of the frame relative to the tractor. The caster wheel 24 and the tractor serve as mobile supporting means maintaining the frame 23 substantially at a fixed height relative to the ground. A wagon tongue 28 is connected to the frame 23 and pulls a wagon 29 that is located in a position to receive grain from the discharge end of the elevator assembly 20.

A rockable member or rockshaft in the form of a tubular beam 27, is disposed transversely to the path of travel, and is journaled at one end by a bearing assembly 30 fixed to the frame 23 and is carried at its other end by a ground engaging wheel 31 journaled on a crank axle 32.

Fixed to the harvester unit 19 is a framework 33 which in turn is fixed to the tubular beam 27.

A rockshaft 34 powered by suitable hydraulic means (not shown) is mounted on the tractor. A lift arm 35 supporting a depending chain 36 is secured to the rockshaft 34. Extending rearwardly and connected at its forward end at the lower end of the chain 36 is a lever 37, the rearward end of which is pivotally secured to a radially extending collar 40 keyed to the tubular beam 27.

Specific details of the harvesting implement have so far been omitted since they are not a feature of the invention. A more complete description can be obtained by reference to U. S. Patents 2,337,592 and 2,592,866.

Two elevator supporting arms 41, fixed at their forward ends to the tubular beam 27, extend rearwardly. The front or lower portion of the elevator assembly 20 is provided with two hubs 42 extending outwardly of the assembly housing. The rear portion of the arms 41 are recessed to receive the hubs 42. Shackles 43 secure the hubs 42 in the arms 41 for pivotal movement relative to one another and serve as trunnion means connecting the beam 27 and the lower end 22a of the elevator 22.

Serving as supporting means for the elevator assembly 20 is a crank shaped column 45 fulcrumed at a lower end 48 to a bracket 46 fixed to the frame 23 and pivotally secured at an upper end 49 to a bracket 47 fixed to an intermediate portion of the elevator assembly 20. As will be clear from the drawings, the upper end 48 and the lower end 48 of the crank shaped column 45 are in the form of laterally disposed legs and cooperate with the respective brackets 46, 47 to form transverse pivotal means or connections between the column and the elevator 22 and frame 11. It also becomes apparent that the two supporting arms 41 in conjunction with the rockable tubular beam 27 become the adjusting means in positioning the lower portion of the elevator assembly 20.

Figure 2:
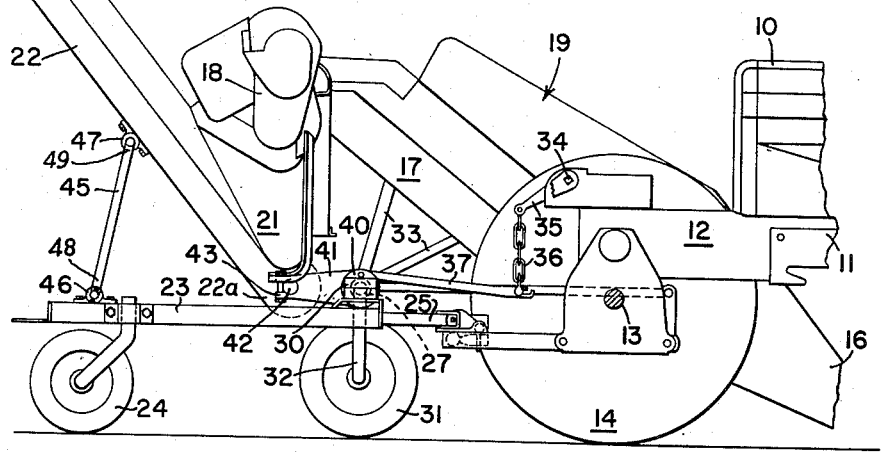
Fig. 2 is a side elevational view of the form shown in Fig. 1. For clarity, the right rear wheel of the tractor is removed and the axle is shown in section.

Looking at the unit as shown in Fig. 2, a manipulation of the hydraulic means resulting in a clockwise rotation of the rockshaft raises the lift arm and causes the lever 37 to rock the tubular beam in a counterclockwise direction to raise the gathering unit.

The rearwardly extending supporting arms 41 will have, upon the same counterclockwise rocking of the beam 27, a resulting downward arcuate movement of their rearward ends forcing the lower portion of the elevator assembly 20 downwardly. The elevator, serving as force transmitting means between the supporting arms 41 and the supporting column 45 will swing the column forwardly about the lower fulcrum 46. The forward swinging of the supporting column will force the elevator, contained at one end by the supporting arms 41, to rock clockwise about the connecting means securing the bracket 47 to the upper end 49 of the supporting column.

Thus counterclockwise movement of the tubular beam results in raising of the gathering unit and through the same motion swinging of the elevator assembly forwardly and therefore away from the wagon.

Figure 4:
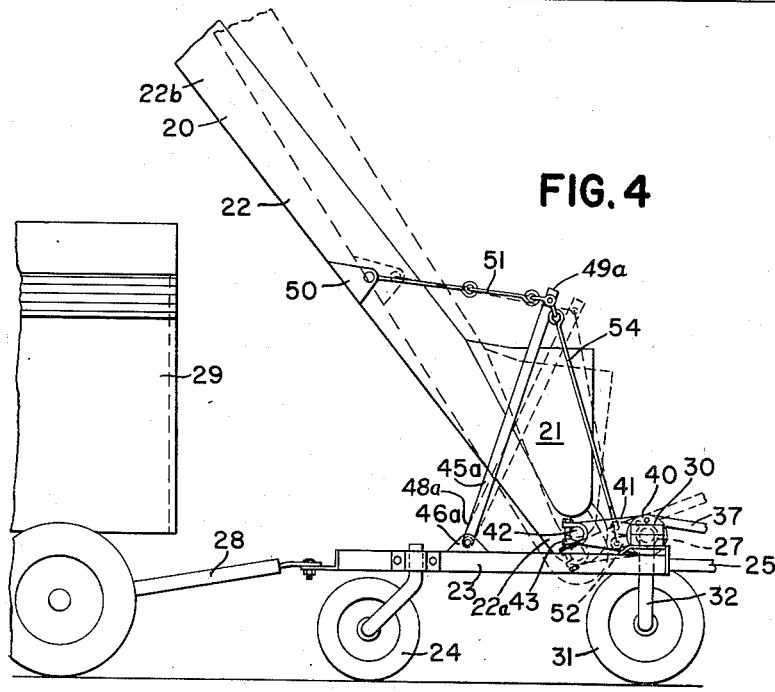
Fig. 4 is a view similar to Fig. 3 showing another form of the invention.

Fig. 4 portrays another form of the invention. A column 45a having a lower end 48a and an upper end 49a is fulcrumed to a bracket 46a fixed to the frame 23 at its lower end 48a. An apertured stirrup 50 is fixed to the side of the elevator assembly. Extending forwardly to the upper end 49a of the column 45a which extends upwardly and forwardly of the elevator assembly 20 is a suspension linkage 51 which is pivotally connected at its rear to the stirrup 50 and at its front to the upper end 49a of the column 45a. A rearwardly extending arm 52 is rigidly fixed to the tubular beam 27. Interconnected between the lever arm 52 and the upper end 49a of the column 45a is a force transmitting tension link 54. All other parts are similar to that already explained.

Figure 3:
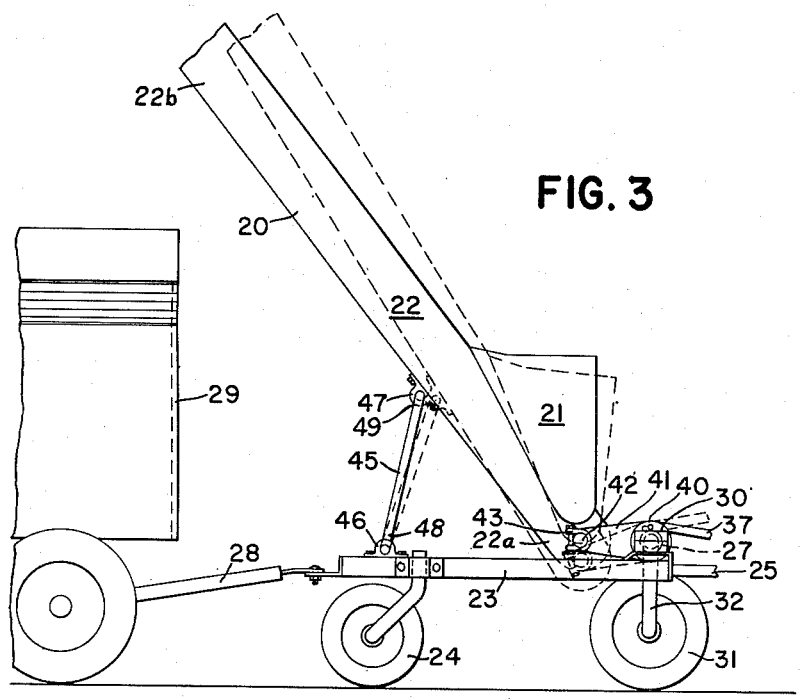
Fig. 3 is a side elevational view of the invention showing more in detail linkages and connections used. It shows in dotted lines the position of the elevator when moved to its forward position.

The system shown in Fig. 4 works generally like that shown in Figs. 1–3. A counterclockwise rocking of the tubular beam 27 causes the lever arm 52 to swing the column 45a forwardly about its lower end in unison with the downward movement of the supporting arms 41 acting against the lower portion of the elevator, producing a bodily movement of the elevator forwardly caused by the column and a movement of the discharge end forwardly due to a clockwise pivoting of the elevator about the intermediate portion of the elevator.

I claim:

1. A conveyor attachment for an agricultural machine, comprising: a rigid fore-and-aft frame mounted on mobile supporting means at a fixed height relative to the ground; an elevator having an intake end proximate to the frame and extending upwardly and rearwardly to a discharge end remote from the frame; a transverse rockshaft journaled on the frame proximate to the intake end of the elevator; arm members rigidly connected to the rockshaft and extending radially therefrom to a position proximate to the intake end; trunnion means connecting the arm members to the intake end of the elevator; a supporting column disposed rearwardly of the intake end having a lower end proximate to the frame and an upper end proximate to a portion of the elevator intermediate the intake and discharge ends of said elevator; means fulcruming the lower end of the column on the frame for fore-and-aft swinging thereof relative to the frame; pivotal means connecting the upper end of the column and the aforesaid intermediate portion of the elevator; and force-transmitting means interconnecting the column and the rockshaft whereby adjustment of the rockshaft will move the column in a fore-and-aft direction and the elevator in a vertical direction.

2. The invention defined in claim 1, in which the pivotal means is a transverse pivotal connection between the upper end of the column and the intermediate portion of the elevator; and the force-transmitting means comprises that part of the elevator between said intermediate portion and the intake end.

3. The invention defined in claim 1, in which: the pivotal means resides in a transverse pivotal connection between the upper end of the column and the intermediate portion of the elevator; and the force-transmitting means comprises a force-transmitting link separate from the elevator and extending between the column and the rockshaft member.

4. The invention defined in claim 1, in which: the upper end of the column extends upwardly beyond the intermediate portion of the elevator; the pivotal means includes a linkage extending between the upper end of the column and the intermediate portion of the elevator; and the force-transmitting means includes a forwardly and downwardly inclined tension link extending between the upper end of the column and the rockshaft.

5. An agricultural harvesting implement comprising a rigid fore-and-aft extending frame mounted on mobile supporting means at a fixed height above the earth and including a transverse rockshaft journaled thereon; a harvesting unit rigidly mounted on the rockshaft and adjustable to be raised or lowered in response to rocking of the rockshaft; an elevator having an intake end pivotally carried on the frame and extending upwardly and rearwardly to a discharge end remote from the frame; elevator supporting means mounted on the frame rearwardly of the rockshaft and movable fore-and-aft relative to the frame; means on the supporting means engaging the elevator at a portion thereof intermediate the intake and discharge ends and serving to permit movement of the discharge end of the elevator upwardly and forwardly as the supporting means is moved forwardly, and downwardly and rearwardly as the supporting means is moved rearwardly; and force transmitting means extending from the rockshaft to the supporting means for moving the latter forwardly as the harvesting unit is raised and rearwardly as the harvesting unit is lowered.

6. The invention defined in claim 5, further characterized by the intake end of the elevator being pivotally carried on the frame by means of rearwardly extending arms having forward ends fixed to the rockshaft and rearward ends proximate to the intake end of the elevator and trunnion means connecting the arms and the intake end of the elevator whereby the force transmitting means comprises the part of the elevator between the intake end and the said intermediate portion thereof.

7. The invention defined in claim 6, further characterized by the elevator supporting means comprising a column member fulcrumed at its lower end to the frame for fore-and-aft swinging and pivotally connected at its upper end to the elevator.

8. The invention defined in claim 5, further characterized by the elevator supporting means comprising a column member fulcrumed at a lower end to the frame for fore-and-aft swinging and having an upper end disposed above the intermediate portion of the elevator and linkage means extending between the upper end of the column and the intermediate portion; and the force transmitting means residing in a force transmitting link extending between the upper end of the column and the rockshaft.

9. An agricultural harvesting implement comprising a rigid fore-and-aft extending frame mounted on mobile supporting means at a fixed height above the earth; an adjustable rockable member mounted on the frame for rocking movement about a transverse axis and having thereon radially and rearwardly projecting arms; a harvesting unit rigidly mounted on the member and having a crop gathering unit disposed forwardly of the axis and adjustable to be raised or lowered in response to rocking of the member; an elevator having an intake end proximate to the rearwardly projecting arms and extending upwardly and rearwardly to a remote discharge end; trunnion means connecting the arms to the intake end; and an elevator supporting column having a lower end fulcrumed to the frame rearwardly of the arms for swinging fore-and-aft and an upper end pivotally attached to the elevator at a portion thereof intermediate the intake and discharge ends.

10. An agricultural harvesting implement comprising a rigid fore-and-aft extending frame mounted on mobile supporting means at a fixed height above the earth; an adjustable member mounted on the frame for rocking movement about a transverse axis and having thereon radially and rearwardly projecting arms; a harvesting unit rigidly mounted on the member and having a crop-gathering unit disposed forwardly of the axis and adjustable to be spaced or lowered in response to rocking of the member; an elevator having an intake end proximate to the rearwardly projecting arms and extending upwardly and rearwardly to a remote discharge end; trunnion means connecting the arms to the intake end; an elevator supporting column having a lower end fulcrumed to the frame rearwardly of the arms for swinging fore-and-aft and an upper end disposed above and forward of the elevator; linkage means connecting the upper end of the column to the elevator at a point thereon rearwardly of the upper end; a lever extending radially outwardly from the adjustable member; and a force transmitting link extending from the lever to the upper end of the column.

11. An agricultural harvesting implement comprising a rigid fore-and-aft extending frame mounted on mobile supporting means at a fixed height above the earth; a rockable member mounted on the frame; a harvesting unit rigidly mounted on the member and adjustable to be raised when the member is rocked in one direction and to be lowered when the member is rocked in the opposite direction; an elevator having an intake end spaced from the rockable member and extending upwardly to a remote discharge end; an elevator supporting column having a lower end fulcrumed to the frame and an upper end pivotally connected to the elevator intermediate its intake end discharge end; and means connecting the elevator to the rockable member for creating angular movement of the elevator relative to the rockable member, said means causing the discharge end to move upwardly and toward the rockable member upon the member rocking in said one direction and downwardly and away from the rockable member upon the member rocking in the opposite direction.

12. An agricultural harvesting implement comprising a rigid fore-and-aft extending frame mounted on mobile supporting means at a fixed height above the earth; a rockable member mounted on the frame; a harvesting unit rigidly mounted on the member and adjustable to be raised when the member is rocked in one direction and to be lowered when the member is rocked in the opposite direction; an elevator having an intake end spaced from the rockable member and extending upwardly to a remote discharge end; an elevator supporting column having a lower end fulcrumed to the frame and an upper end connected to the elevator; and means connecting the elevator to the rockable member for causing the elevator to be fulcrumed toward the rockable member upon the member rocking in said one direction and away from the rockable member upon the member rocking in the opposite direction.

References Cited in the file of this patent

UNITED STATES PATENTS

| Re. 22,279 | Hyman et al. | Mar. 2, 1943 |
| 1,945,119 | Metcalf | Jan. 30, 1934 |
| 2,337,592 | Coultas et al. | Dec. 28, 1943 |
| 2,592,866 | Coultas et al. | Apr. 15, 1952 |